June 10, 1941. T. F. MURRAY, JR., ET AL 2,245,218
WATER-SOLUBLE PHOTOGRAPHIC COATING
Filed July 27, 1938
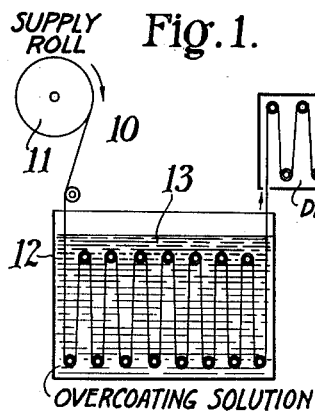
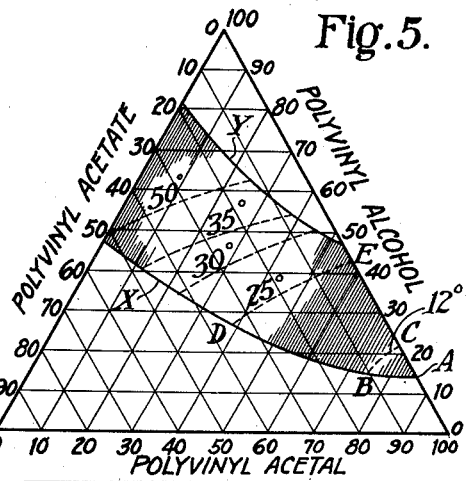
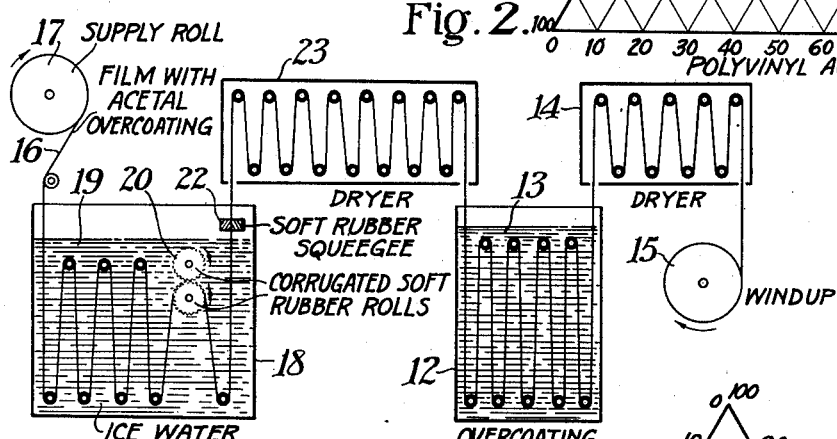
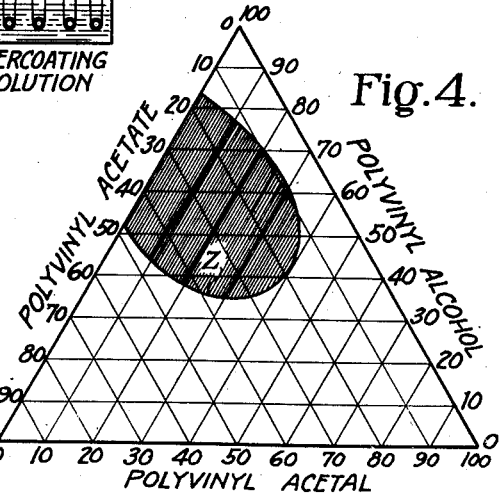
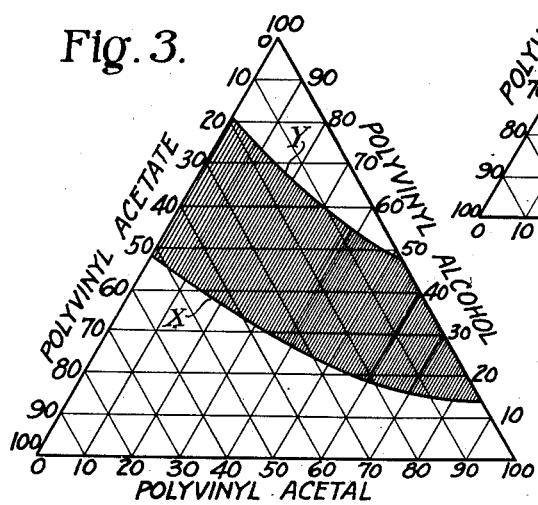
Thomas F. Murray, Jr.
William O. Kenyon
INVENTORS
BY *(signatures)*
ATTORNEYS Patented June 10, 1941

2,245,218

UNITED STATES PATENT OFFICE 2,245,218

WATER-SOLUBLE PHOTOGRAPHIC COATING

Thomas F. Murray, Jr., and William O. Kenyon, Rochester, N. Y., assignors to Eastman Kodak Company, Rochester, N. Y., a corporation of New Jersey Application July 27, 1938, Serial No. 221,579

8 Claims. (Cl. 91—69)

This invention relates to overcoating layers for photographic film and particularly to overcoating layers composed of synthetic resins soluble in water at low temperatures.

It is frequently desirable to apply a removable or renewable overcoating layer to photographic film, especially motion picture film. One purpose of such coating is to prevent abrasion of the film by passage through the gates of the camera or projector or other machine in which the film is used. When a motion picture film has been run through a projector a number of times, the surfaces become scratched and the film is thus rendered unsatisfactory for continued use, although in other respects the film may be in good condition. This abrasion scratches the coating itself and usually does not penetrate to the film support or emulsion layers. By renewing the overcoating layer or treating it so that the scratches are removed, the undesirable effects resulting from abrasion can be overcome. Overcoating layers designed to relieve or prevent abrasion have hitherto been suggested but no completely satisfactory way of removing or renewing these layers has been found.

It is, accordingly, an object of the present invention to provide removable and renewable overcoating layers for photographic film. A further object is to provide an anti-abrasion coating which may be removed and renewed. A still further object is to provide an overcoating layer soluble in cold water. A still further object is to provide an overcoating layer which can be coated on the emulsion or base of photographic film without affecting the mechanical or photographic properties of such film. A still further object is to provide an overcoating for photographic film which may be removed without injury to the underlying layers. Still further objects will be apparent from the following description of our invention.

These objects are accomplished by applying to the film an overcoating composed of a synthetic resin of the polyvinyl acetaldehyde acetal or the partially hydrolyzed polyvinyl acetate class, having certain compositions as fully described hereinafter.

In the accompanying drawing, Fig. 1 is a sectional view showing a method of applying the overcoating layers.

Fig. 2 is a sectional view showing a machine which may be used to remove the overcoating layers.

Fig. 3 is a triangular graph showing the compositions of our resins which are soluble in water at about 0° C.

Fig. 4 is a triangular graph showing the compositions of our resins which are soluble at 40° C.

Fig. 5 is a triangular graph showing the compositions of our resins which gel in various temperature ranges.

The protecting or overcoating layer used according to our invention is, as stated above, intended to be soluble in water at low temperatures so that it may be removed from the film by treatment in a bath of cold water. The solubility range varies with the composition of the resin; hence the composition of the resin is chosen so that it will be soluble in water of the desired temperature. In general, the resins which we use show a wider range of solubility at low temperatures than at high temperatures, although there are some resins which are soluble in water at higher temperatures but insoluble at lower temperatures. This will be apparent from the graphs illustrating this invention, as will be explained later.

The resins which we propose to use, according to the preferred embodiment of our invention, are of the polyvinyl acetaldehyde acetal or partially hydrolyzed polyvinyl acetate types. The structural formula of the polyvinyl acetaldehyde acetal resins might be represented as follows:

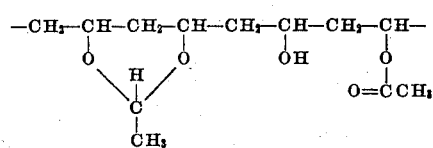

and the structural formula of the partially hydrolyzed polyvinyl acetate resins may be represented as follows:

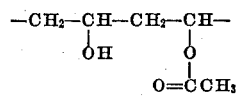

As may be seen from these formulae the acetal resins used contain the acetaldehyde acetal group as well as the hydroxyl and acetate groups and the partially hydrolyzed polyvinyl acetate resins contain only hydroxyl and acetate groups attached to the resin chain. These formulae are merely illustrative of the particular resins referred to, and do not necessarily represent the sequence or molecular ratio in which these groups occur in the resin.

It will be understood that these resins may be made with various proportions of hydroxyl, acetate, and acetal groups in the molecule. Methods of making these resins have been described in prior patents, such as Voss U. S. Patent No. 1,939,422 and Morrison et al. U. S. Patent No. 2,036,092. These resins are made from polyvinyl acetate by de-esterifying and treating with acetaldehyde to introduce the acetal groups. By varying such conditions as the viscosity of the vinyl ester polymer, the extent of hydrolysis, the amount of aldehyde reacted with the hydrolyzed ester polymer, and the character and amount of catalyst used, the proportion of the various groups substituted in the resin chain may be controlled.

The water-solubility of these resins depends on the relative proportion of hydroxyl and acetyl groups in the molecule (and conversely on the proportion of acetal groups). This is indicated by Fig. 3 of the accompanying drawing. In that figure, which represents the composition of resins soluble in water at 0° C., the portion of the graph between the curve X and the curve Y represents the water-soluble compositions. On this graph the horizontal lines (those parallel to the base line) represent proportions of polyvinyl alcohol in the resin molecule. The lines parallel to the right-hand side of the triangle represent proportions of polyvinyl acetate and the lines parallel to the left-hand side of the triangle represent proportions of polyvinyl acetal. It may be seen that for any point on the base lines or within the triangle the sum of the percentages of the various constituents is 100%. For example, for a point in the triangle representing 33.7% by weight polyvinyl alcohol and 34.5% by weight polyvinyl acetate, it is found that the polyvinyl acetal content is 31.8% by weight. This point is between the curves X and Y and, therefore, represents a resin soluble in water at 0° C. A resin of this particular composition becomes progressively less soluble in water as the temperature of the water is increased. This is shown by the graph of Fig. 4 of the drawing in which the portion on the graph within the curve Z represents those compositions of resins soluble in water at 40° C. It may be seen that a resin having 33.7% polyvinyl alcohol and 34.5% polyvinyl acetate lies near the boundary line of curve Z which should indicate that at 40° C. this resin was of doubtful solubility. That is, in fact, the case and at 40° C. it has been found that a resin of this composition exhibits only partial solubility or swelling.

Those resins which contain no acetal groups are represented by the left-hand base line of the graphs. For example, a resin containing 70% polyvinyl alcohol and 30% polyvinyl acetate is represented on the graphs by a point between curves X and Y and within curve Z. This indicates that a resin of this composition should be soluble in water at both 0° C. and 40° C. and this is verified by experimental evidence.

Resins of certain compositions possess the property of gelling and also the property known as syneresis when the temperature is raised after they are coated. By "syneresis" we refer to that property of gels by which under certain conditions they exude or "squeeze out" water or other solvent or separate into two phases on ageing. Many of the acetal resins described in the present application possess the property of forming a gel when the temperature of a solution or coating of them is raised, and the additional property of syneresing when the temperature is farther raised. In the case of all of the resins referred to in the present application, the temperature of syneresis is higher than the gelling temperature.

This property of syneresis of the resins is often advantageous as an aid to rapid drying, but if a water-soluble material, such as a dye is included in the coating composition, the syneresis results in bleeding and loss of the dye. Under the usual conditions of curing a film would be formed from the dope and beads of moisture would then appear on the surface of the coating. If the coating composition contained a water soluble dye, this would produce areas of non-uniform color density in the film and loss of dye in the water exuded by syneresis.

We have found that by curing or drying a coating of one of the resins made from an aqueous solution at a temperature between the temperature of gelation and the temperature of syneresis, a clear film could be obtained without the occurrence of syneresis. Another method of curing the resin without the occurrence of syneresis is to pass a current of air over the coating while it is being cured at room temperature. Coatings thus prepared with a water-soluble dye show no evidence of syneresis. Although we do not wish to be limited to any particular explanation of this behavior, we believe that it is due to the fact that the rapid evaporation of moisture from the film causes the film to become cooler than the surrounding atmosphere and thus to maintain the curing temperature within the range at which syneresis does not occur.

In Fig. 5 we have illustrated diagrammatically the gelling temperatures of polyvinyl acetaldehyde acetal resins of various compositions. As shown therein, the region within the lines X and Y represents resins soluble in water at about 0° C. The dotted lines B, C, D, E, etc., denote the compositions of the resins which gel at those temperatures. For example, polyvinyl acetaldehyde acetal resins whose compositions lie within the area ABC gel at 8–12° C., or slightly below these temperatures, and resins whose compositions lie within the area BCED gel at temperatures between about 12° C. and 25° C. The compositions of these resins may be readily calculated from the graph. For example, resins whose compositions are represented by the region ABC have a hydroxyl group content equivalent to more than 15% polyvinyl alcohol by weight and a polyvinyl acetal of more than 75% by weight. Resins of certain compositions, particularly those having little or no acetal content, do not exhibit gelling properties even at elevated temperatures. The following table illustrates the gelation temperature of various polyvinyl acetaldehyde acetal and partially hydrolyzed polyvinyl acetate resins:

| Percent vinyl alcohol | Percent vinyl acetate | Percent vinyl acetal (by diff.) | Gelation temp., °C. |
| --- | --- | --- | --- |
| 15.6 | 1.5 | 82.9 | 10. |
| 22.1 | 1.6 | 76.3 | 12. |
| 25.2 | 2.0 | 72.8 | 13. |
| 35.8 | 17.0 | 47.2 | 25. |
| 33.7 | 34.5 | 31.8 | 29. |
| 47.8 | 1.3 | 50.9 | 29. |
| 51.5 | 13.5 | 35.0 | 35. |
| 45.6 | 44.8 | 9.6 | 50. |
| 51.1 | 48.9 | 0 | 55. |
| 79.1 | 20.9 | 0 | No gel at 100° C. |
| 70.5 | 29.5 | 0 | Do. |
| 74.8 | 13.1 | 12.1 | Do. |

From the graphs of Figs. 3 or 4 or any other graphs indicating solubilities at other temperatures, it is possible to derive mathematical expressions for the compositions of resins soluble at the various temperatures. This may readily be done by disregarding the acetal content of the resin in each case (since it is a direct function of the hydroxyl and acetyl content of the resin) and transforming the curves to a system of rectangular coordinates taking into consideration only the polyvinyl alcohol and polyvinyl acetate content of the resin. For example, in the case of the resins soluble in water at 0° C. the following expressions were derived.

Let $b$ equal the polyvinyl alcohol and let $a$ equal the polyvinyl acetate content.

It is found that—

$b = 13.5 - .04a + .014a^2$ for curve X, and
$b = 48.5 + .75a + .05a^2$ for curve Y.

This means that at 0° C. all those resins are soluble in water whose hydroxyl group content is equivalent to a percent by weight of polyvinyl alcohol greater than $(13.5 - .04a + .014a^2)$ and less than $(48.5 + .75a + .05a^2)$, where $a$ represents the the acetate group content of the resin expressed as a percent by weight of polyvinyl acetate. These expressions will include resins soluble in water at higher temperatures. Although the expressions are derived from a graph of resins soluble in water at 0° C. they are definite expressions of resin composition and include certain resins soluble in water at temperatures other than 0° C.

Other polyvinyl acetal resins which may be used according to our invention include propionaldehyde acetals, butyraldehyde acetals, formaldehyde-acetaldehyde acetals, formaldehyde-propionaldehyde acetals, formaldehyde-butyraldehyde acetals, acetaldehyde-propionaldehyde acetals, acetaldehyde-butyraldehyde acetals, and propionaldehyde-butyraldehyde acetals. Various compositions of these resins are soluble in cold water, depending on the proportion of aldehyde, acetyl, and hydroxyl groups in the molecule. In the case of the polyvinyl propionaldehyde acetal, formaldehyde-acetaldehyde acetal, and acetaldehyde-butyraldehyde acetal, for example, resins containing about 20% or more hydroxyl calculated as polyvinyl alcohol, and less than about 1% polyvinyl acetate, are soluble in cold water.

The resins used according to our invention may be applied to the photographic film from solution in suitable solvents, in various ways, before or after exposure or development of the film. The choice of solvents will depend to a large extent upon the composition of the film base. For example, methyl alcohol would be a suitable solvent for use on a cellulose acetate base but not on a cellulose nitrate base, since it is a strong solvent for cellulose nitrate. Solvents such as ethyl alcohol, ethyl acetate, 1-4 dioxane or mixtures of these, are suitable for both organic ester bases of the types of cellulose acetate and cellulose inorganic ester bases of the type of cellulose nitrate. Water may also be used as a solvent in applying the resins, if the film base has a coating thereon which will be wet by the resin solution, or to which the resin solution will adhere satisfactorily. The coatings may be applied to any of the usual photographic supports as well as to any support of a cellulose simple or mixed organic acid ester. It is important, however, that the solvent be suitably chosen with regard to the support so that it does not penetrate into the support to such an extent that the coating cannot be removed after abrasion.

The cold-water soluble resins may be coated on a photographic film after developing and fixing, and when the film contains a visible image. When so coated, the resin takes the abrasion due to projection or use of the film, and the coating can be removed, after it becomes abraded, and renewed as often as desired to keep the film in good projection condition. In this way the overcoating layer is subjected to any scratching, abrading or imbedding of dirt or foreign matter which must usually be withstood by the surface of the film, and after such scratching or abrasion has occurred, the overcoating layer can be removed or renewed as often as desired to keep the film in acceptable condition.

The method of applying and removing our resin coatings will now be described with particular reference to Figs. 1 and 2 of the accompanying drawing. As shown therein, Fig. 1 is a sectional view of a machine suitable for applying the resin coatings to both sides of a film, according to our invention. As shown in Fig. 1 the film 10 passes from a supply roll 11 into a tank 12 containing 0.1 cc. of ethylene glycol monoacetate a suitable solvent. After passing through the tank 12 the film is taken into a drying chamber 14 which is heated by suitable means, not shown, and then passes to a take-up roll 15. The concentration of the overcoating material in the coating solution may be varied, depending on the thickness of the coating desired. The thickness of the coating may be varied to some extent by the number of convolutions of the film in the tank 12 or the film may be passed through several successive tanks to increase the thickness of the overcoating layer.

Fig. 2 is a sectional view of an apparatus designed to remove the overcoating layer from the film. The coated and scratched film 16 contained on a supply roll 17 is passed into a tank 18 containing ice water 19. Within the tank 18 and below the surface of the water 19 are located rolls 20 having corrugated soft rubber surfaces. These rolls are revolved slowly in a direction opposite to that of the movement of the film to abrade the resin coating from the surface of the film. A squeegee 22 located beneath or above the surface of the water insures removal of the resin coating. The squeegee may be composed of soft rubber, felt or other material not affected by the organic solvents which may be contained in the film or in the ice water solution.

After passage through the water solution the film is led through a drying chamber 23 heated by suitable means, not shown, and is then taken into the tank 12 containing coating solution 13 and again through the drier 14 and onto the take-up roll 15. The drier 23 may be omitted, if desired, and the film may be passed directly from the water tank 18 into the coating tank 12.

These diagrammatic showings of machines suitable for applying and removing the resin coating are to be understood as being illustrative only and are not to be taken as limiting the method of applying or removing the coatings thereto. It is obvious, for example, that a machine designed to apply the overcoating to an emulsion coated support before slitting and perforating might be different in design from a machine designed to apply the overcoating layer to a processed film.

Our invention will be further explained by the following examples illustrating preferred embodiments thereof. It is to be understood, however, that our invention is in no way to be taken as limited thereto.

*Example I*

A polyvinyl acetaldehyde acetal resin containing 14.4% polyvinyl alcohol and 1.7% polyvinyl acetate was dissolved in an ethyl alcohol and ethyl acetate solvent in the amount of 3 grams of resin in a solvent mixture consisting of 70 cc. of 95% ethyl alcohol and 30 cc. of ethyl acetate. A section of exposed and processed positive motion picture film on cellulose nitrate base was passed through the solution prepared as above and then dried. A clear transparent coating of acetal resin was thus deposited on both the emulsion and base sides of the film. This overcoated layer was found to have excellent adhesion.

*Example II*

A polyvinyl acetaldehyde acetal resin having the composition described in Example I was dissolved in an ethyl alcohol and ethyl acetate solvent in the amount of 1 gram of resin in a solvent mixture consisting of 80 cc. of 95% ethyl alcohol and 20 cc. of ethyl acetate. A section of exposed and processed positive motion picture film on cellulose nitrate base was passed through the solution prepared as described and was then dried. A clear transparent coating of excellent adhesion was thereby deposited on both emulsion and base sides of the film.

*Example III*

A polyvinyl acetaldehyde acetal of the composition described in Example I was dissolved in 1-4 dioxane in the amount of 1 gram of resin in 100 cc. of solvent. A section of processed positive motion picture film on cellulose nitrate base was passed through the solution prepared as described and was then dried. A clear transparent overcoating of good adhesion was obtained. This overcoated film was scratched by friction, then agitated in ice water for 3 or 4 minutes. The acetal overcoating was dissolved and left a film practically free from scratches. This film could be then recoated, as described in any of the examples.

*Example IV*

A polyvinyl acetaldehyde acetal resin containing 22% by weight polyvinyl alcohol and 1.6% by weight polyvinyl acetate was dissolved in water at a temperature of 5° C. to produce a dope containing 9% by weight of the resin. The cooled dope was coated on a glass plate by means of the customary coating technique. The coating was cured at room temperature for thirty minutes, then placed in a drying cabinet at a temperature of about 50° C. for 18 hours.

The following stages in the curing were observed. After deposition of the resin dope upon the warm surface of the glass plate, it quickly formed an opaque gel of great firmness. Within a few minutes after coating, the plate could be picked up and stacked on edge without danger of distorting the coating. Within a few minutes after gelation, the exact time being dependent upon the temperature of the surrounding atmosphere, the coating began to synerese and squeeze out a great deal of the water which could then be drained from the surface. Upon further curing of the coating, the opacity disappeared and a clear hard film of high flexibility, tensile strength and tear strength was obtained.

*Example V*

To 200 grams of the aqueous dope of acetal resin described in Example IV there was added 0.4 gram of water-soluble Nigrosine (color index No. 865). This dope was coated on a glass plate and cured at temperatures between 12 and 15° C. to yield a clear film without the occurrence of syneresis. At a temperature of 20° C., syneresis was found to occur.

*Example VI*

An aqueous solution of our resins may be coated on cellulosic film base. It is advantageous to add a high boiler and a spreading agent to the solution in this case. An anti-halation backing for photographic film was made up as follows:

Eight grams of a polyvinyl acetaldehyde acetal resin containing 22.1% polyvinyl alcohol and 1.6% polyvinyl acetate were dissolved in 100 cc. of water at a temperature of about 5° C. To 20 g. of the resulting dope there were added 0.008 g. of the oleic acid amide of N-methyl taurine (Igepon T), and 20 cc. of distilled water containing 0.1 cc. of ethylene glycol monoacetate and 0.08 g. of water-soluble Nigrosine. The dope was coated on the base side of a cellulose nitrate motion picture film and permitted to dry. The coating was removable in ice water with mild rubbing.

*Example VII*

An aqueous dope of polyvinyl acetaldehyde acetal resin made up as in Example VI but without the Nigrosine was coated on both sides of a cellulose nitrate motion picture film by immersing the film in a container of the dope which was kept cold to prevent gelling. A colorless, transparent overcoating was thereby produced, and after drying, it could be removed in ice water assisted by gentle rubbing.

The same dope was used to apply a coating to the emulsion side only of the film, and to the base side only, and in both cases the coatings were removable in ice water.

A dye might also be incorporated in the backing or overcoating layer by immersing a film coated with an uncolored resin layer into a solution of a dye at such temperature that the resin is not removed but the dye is imbibed into it.

*Example VIII*

A polyvinyl formaldehyde-acetaldehyde acetal resin containing 18% by weight polyvinyl alcohol and 0.8% by weight of polyvinyl acetate was dissolved in water at a temperature of 20° to produce a dope containing about 7% by weight of the resin. The cooled dope was coated on a glass plate by means of the customary coating technique. The coating was dried at room temperature for about 30 minutes, then placed in a drying cabinet at a temperature of 80° C. for 18 hours. A clear transparent coating was thereby obtained.

*Example IX*

A polyvinyl propionaldehyde acetal resin was made by placing 10 grams of polyvinyl alcohol in 200 cc. of water, heating the mixture on the steam bath until the resin dissolved, cooling the resulting solution to room temperature and adding 4 grams of propionaldehyde and 5 cc. of concentrated hydrochloric acid. The reaction began quickly as evidenced by a rise in the temperature of the solution and the formation of a precipitate. After standing for 2 hours at room temperature, a supernatant liquid was decanted from the precipitated resin and the latter was dissolved in a large quantity of ice water. The resin was isolated by pouring the ice water dope into a quantity of hot water, after which the resin was dried in vacuo at room temperature. The dry resin was insoluble in acetone but soluble in methyl alcohol. The polyvinyl alcohol content of this resin was 20.83% and since it was prepared from polyvinyl alcohol there was no appreciable amount of polyvinyl acetate.

This resin could be dispersed in water at 0° C., although it did not disperse as readily as polyvinyl acetaldehyde acetal resin of a similar composition. The resulting ice water dope formed a gel at room temperature and could be coated on glass plates or cellulosic film support.

*Example X*

A polyvinyl acetaldehyde-butyraldehyde acetal resin was made by adding 10 grams of polyvinyl alcohol to 200 cc. of water and heating the mixture on the steam bath until dispersion of the resin was complete, cooling the dope to room temperature and adding 2.42 grams of acetaldehyde and 5 cc. of concentrated hydrochloric acid. The dope was allowed to stand for 1¼ hours at room temperature and at the end of this period a test sample was found to possess a gelling point of 26° C. N-butyraldehyde was then added in the amount of 0.553 gram and the mixture was maintained at 15° C. for twenty hours. The dope was diluted with ice water, precipitated into hot water and the resin which separated was dried at 50° C. It possessed a polyvinyl alcohol content of 22.3% and since it was prepared from polyvinyl alcohol, contained no appreciable amount of polyvinyl acetate.

This resin could be dispersed in water at about 0° C., although it was not dispersed as readily as a polyvinyl acetaldehyde acetal resin of a similar composition. The resulting ice water dope formed a gel at room temperature and could be coated on glass plates or cellulosic film to form a transparent coating.

The water-soluble resins described herein may be used for purposes other than prevention of scratching or abrasion of photographic film. For example, such materials may be used as layers in composite structures in which separation is desired, such as stripping film, and the water-solubility properties used for the purpose of dissolving the resin layer and enabling removal of certain portions of the film. The resins may also be used in anti-static backings as well as in the anti-halation backings or in the filter overcoating layers described herein. Non-photographic uses may also be visualized, such as coating the surface of articles to protect them during transportation or handling. The coating could be applied by spraying or dipping in organic solvent or cold water solution and the coating could subsequently be removed by washing in cold water or other suitable solvent.

Our invention may be used in the application of overcoating layers to various articles and is adaptable for use with all types of motion picture film, including positive or negative film, as well as with cut film or sheet film. The overcoating is readily removable and renewable under conditions which will not adversely affect the film, and the resins may be applied from various types of solution. We do not wish to limit our invention to the materials, solvents, concentrations or temperatures described above and it is to be understood that numerous other modifications and uses of our invention are possible within the scope of the appended claims.

What we claim is:

1. A photographic element protected against permanent abrasion comprising a support having thereon at least one gelatin layer which is softened by hot water but not by cold water, and on at least one side of said element a synthetic resin coating selected from the group consisting of polyvinyl acetaldehyde acetals and partially hydrolyzed polyvinyl acetates whose hydroxyl group content is equivalent to a per cent by weight of polyvinyl alcohol greater than about $(13.5-.04a+.014a^2)$ and less than about $(48.5+.75a+.05a^2)$ where $a$ represents the acetate group content of the resin expressed as a per cent by weight of polyvinyl acetate, said resin being soluble in water at a temperature of about 0° C.

2. The method of protecting against permanent abrasion a photographic element comprising a support having thereon at least one gelatin layer which is softened by hot water but not by cold water, which comprises coating at least one side of said element with an aqueous solution of a synthetic resin selected from the group consisting of polyvinyl acetaldehyde acetals and partially hydrolyzed polyvinyl acetates whose hydroxyl group content is equivalent to a per cent by weight of polyvinyl alcohol greater than about $(13.5-.04a+.014a^2)$ and less than about $(48.5+.75a+.05a^2)$ where $a$ represents the acetate group content of the resin expressed as a percent by weight of polyvinyl acetate, said resin being soluble in water at a temperature of about 0° C. and capable of gelling, and curing said coating at a temperature about the gelling temperature of the resin.

3. The method of protecting against permanent abrasion a photographic element comprising a support having thereon at least one gelatin layer which is softened by hot water but not by cold water which comprises coating at least one side of said element with a solution of a synthetic resin selected from the group consisting of polyvinyl acetaldehyde acetals and partially hydrolyzed polyvinyl acetates whose hydroxyl group content is equivalent to a per cent by weight of polyvinyl alcohol greater than about $(13.5-.04a+.014a^2)$ and less than about $(48.5+75a+.05a^2)$ where $a$ represents the acetate group content of the resin expressed as a per cent by weight of polyvinyl acetate, said resin being soluble in water at a temperature of about 0° C.

4. The method of protecting against permanent abrasion a photographic element comprising a support having thereon at least one gelatin layer which is softened by hot water but not by cold water which comprises coating at least one side of said element with a solution of a polyvinyl acetaldehyde acetal resin whose hydroxyl group content is equivalent to a per cent by weight of polyvinyl alcohol greater than about $(13.5-.04a+.014a^2)$ and less than about $(48.5+.75a+.05a^2)$ where $a$ represents the acetate group content of the resin expressed as a per cent by weight of polyvinyl acetate, said resin being soluble in water at a temperature of about 0° C.

5. The method of applying a removable overcoating layer of a synthetic resin to a photographic film which comprises coating at least one side of a support having thereon a gelatin layer which is softened by hot water but not by cold water, with an aqueous solution of a synthetic resin selected from the group consisting of polyvinyl acetaldehyde acetals and partly hydrolyzed polyvinyl acetates whose hydroxyl group content is equivalent to a per cent by weight of polyvinyl alcohol greater than about $(13.5-.04a+.014a^2)$ and less than about $(48.5+.75a+.05a^2)$ where $a$ represents the acetate group content of the resin being soluble in water at a temperature of about 0° C. and capable of gelling, and having a syneresis temperature above its gelling temperature, and curing said coating at a temperature between the gelling temperature and syneresis temperature of the resin.

6. The method of applying a removable antihalation layer to a photographic film which comprises coating a transparent support having on one side thereof a gelatin emulsion layer which is softened by hot water but not by cold water, with an aqueous solution of a synthetic resin selected from the group consisting of polyvinyl acetaldehyde acetals and partially hydrolyzed polyvinyl acetates whose hydroxyl group content is equivalent to a percent by weight of polyvinyl alcohol greater than about $(13.5-.04a+.014a^2)$ and less than about $(48.5+.75a+.05a^2)$ where $a$ represents the acetate group content of the resin expressed as a percent by weight of polyvinyl acetate, said resin being soluble in water at a temperature of about 0° C. and capable of gelling, and a water-soluble dye, said solution being coated on the side of the support opposite to the gelatin emulsion layer, said resin having a syneresis temperature about its gelling temperature, and curing said coating at a temperature between the gelling temperature and syneresis temperature of the resin.

7. A photographic element protected against permanent abrasion comprising a support having thereon at least one gelatin layer which is softened by hot water but not by cold water, and over said gelatin layer a synthetic resin coating selected from the group consisting of polyvinyl acetaldehyde acetals and partially hydrolyzed polyvinyl acetates whose hydroxyl group content is equivalent to a percent by weight of polyvinyl alcohol greater than about $(13.5-.04a+.014a^2)$ and less than about $(48.5+.75a+.05a^2)$ where $a$ represents the acetate group content of the resin expressed as a percent by weight of polyvinyl acetate, said resin being soluble in water at a temperature of about 0° C.

8. The method of protecting a finished photographic film against abrasion, which comprises coating the film after developing and fixing and when containing a visible photographic image in a gelatin layer which can be softened by hot water but not by cold water, with a transparent protective layer consisting of a polyvinyl acetal resin soluble in water at a temperature of about 0° C. removing said coating after it has become abraded, by dissolving it in water at a temperature which does not appreciably soften said gelatin layer, and recoating said film with a protective layer.

THOMAS F. MURRAY, Jr.
WILLIAM O. KENYON.

CERTIFICATE OF CORRECTION.

Patent No. 2,245,218. June 10, 1941.

THOMAS F. MURRAY, JR., ET AL.

It is hereby certified that error appears in the printed specification of the above numbered patent requiring correction as follows: Page 3, second column, line 20, for "0.1 cc. of ethylene glycol monoacetate" read --the overcoating solution 13 of resin in--; page 5, second column, line 32, claim 2, for "about" read --above--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.